United States Patent
Ma et al.

(10) Patent No.: US 12,041,504 B2
(45) Date of Patent: Jul. 16, 2024

(54) MOBILITY MANAGEMENT METHOD, USER EQUIPMENT, AND NETWORK SIDE DEVICE

(71) Applicant: VIVO MOBILE COMMUNICATION CO., LTD., Chang'an Dongguan (CN)

(72) Inventors: Yue Ma, Chang'an Dongguan (CN); Yumin Wu, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 16/637,387

(22) PCT Filed: Aug. 1, 2018

(86) PCT No.: PCT/CN2018/098009
§ 371 (c)(1),
(2) Date: Feb. 7, 2020

(87) PCT Pub. No.: WO2019/029416
PCT Pub. Date: Feb. 14, 2019

(65) Prior Publication Data
US 2020/0187073 A1    Jun. 11, 2020

(30) Foreign Application Priority Data
Aug. 9, 2017   (CN) .......................... 201710676645.0

(51) Int. Cl.
*H04W 36/14* (2009.01)
*H04W 36/00* (2009.01)
*H04W 36/30* (2009.01)

(52) U.S. Cl.
CPC ....... *H04W 36/14* (2013.01); *H04W 36/0038* (2013.01); *H04W 36/0061* (2013.01); *H04W 36/30* (2013.01)

(58) Field of Classification Search
CPC ............. H04W 36/14; H04W 36/0038; H04W 36/0061; H04W 36/30; H04W 36/00; H04W 36/0083
See application file for complete search history.

(56) References Cited

U.S. PATENT DOCUMENTS

| 10,772,034 B2* | 9/2020 | Chun ................... H04W 48/08 |
| 2007/0099617 A1 | 5/2007 | Sipila |

(Continued)

FOREIGN PATENT DOCUMENTS

| CN | 101772118 A | 7/2010 |
| CN | 103329597 A | 9/2013 |

(Continued)

OTHER PUBLICATIONS

Huawei, 3GPP TSG RAN WG2 #98, "Network selection for initial access in E-UTRA connected to 5GC", May 15-19, 2017, R2-1705709 (Year: 2017).*

(Continued)

*Primary Examiner* — Umair Ahsan
(74) *Attorney, Agent, or Firm* — Culhane PLLC; Stephen J. Weed

(57) ABSTRACT

A mobility management method, a User Equipment (UE) and a network side device are provided. The mobility management method includes: receiving core network information about each cell from a network side device, the core network information being used to indicate a type of a core network; and when a UE is in an idle state, performing cell reselection in accordance with the type of the core network for each cell and a capability of the UE for supporting the core network.

4 Claims, 6 Drawing Sheets

(56) References Cited

U.S. PATENT DOCUMENTS

| | | | |
|---|---|---|---|
| 2013/0070680 A1* | 3/2013 | Iwamura | H04L 5/001 370/328 |
| 2014/0295840 A1 | 10/2014 | Keskitalo et al. | |
| 2017/0013532 A1 | 1/2017 | Olofsson et al. | |
| 2018/0041936 A1* | 2/2018 | Kim | H04W 72/085 |
| 2018/0352491 A1* | 12/2018 | Shih | H04W 76/27 |
| 2019/0182737 A1* | 6/2019 | Futaki | H04W 36/0033 |

FOREIGN PATENT DOCUMENTS

| | | |
|---|---|---|
| CN | 104053200 A | 9/2014 |
| CN | 105101311 A | 11/2015 |
| CN | 105101345 A | 11/2015 |
| CN | 106559769 A | 4/2017 |
| EP | 1744582 A1 | 1/2007 |
| WO | 2014161161 A1 | 10/2014 |
| WO | 2015139296 A1 | 9/2015 |
| WO | 2017062244 A1 | 4/2017 |

OTHER PUBLICATIONS

Huawei, 3GPP TSG RAN WG2 #96, "Discussion on LTE-NR handover", Nov. 14-18, 2016, R2-168570 (Year: 2016).*

Huawei: "Inter-system mobility cases", 3GPP Draft; R3-170229 Intersystem Mobility, 3rd Generation Partnership Project (3GPP), Mobile Competence Centre; 650, Route Des Lucioles; F-06921 Sophia-Antipolis Cedex; France; RAN WG3, Spokane, Washington, USA; Jan. 17, 2017-Jan. 19, 2017, Jan. 11, 2017 (Jan. 11, 2017) (Year: 2017).*

1st Chinese Office Action for Chinese Application No. 201710676645. 0, dated Feb. 28, 2020 (Feb. 28, 2020)—10 pages (English translation—9 pages).

Ericsson: "Camping in NR," Tdoc R2-1706636, 3GPP TSG RAN WG2 NR-AH#2, Qingdao, P.R. China, Jun. 27, 2017, 4 pages.

Ericsson: "CN Selection when Accessing" R2-1700904, 3GPP TSG-RAN WG2 #97, Athens, Greece, Feb. 13, 2017, 3 pages.

Ericsson: "CN Selection when Accessing," Tdoc R2-1704177, 3GPP TSG-RAN WG2 #98, Hangzhou, P.R. China, May 15, 2017, 3 pages.

Extended European Search Report for European Application No. 18844479.8, dated Jun. 30, 2020 (Jun. 30, 2020)—12 pages.

Huawei, HiSilicon: "Discussion on LTE-NR handover," R2-168570, 3GPP TSG-RAN WG2 Meeting #96, Reno, Nevada, US, Nov. 14, 2016, 3 pages.

Huawei, HiSilicon: "Network Selection for Initial Access in eLTE Network" R2-1701853, 3GPP TSG-RAN WG2 #97, Athens, Greece, Feb. 13, 2017, 3 pages.

Huawei, HiSilicon: "Network selection for initial access in E-UTRA connected to 5GC," R2-1705709, 3GPP TSG-RAN WG2 #98, Hangzhou, China, May 15, 2017, 3 pages.

Huawei: "Inter-system Mobility Cases," R3-170229, 3GPP TSG-RAN WG3 AH, Spokane, Washington, USA, Jan. 17, 2017, 5 pages.

International Search Report and Written Opinion for International Application No. PCT/CN2018/098009, dated Feb. 20, 2020 (Feb. 20, 2020)—9 pages (English translation—6 pages).

LG Electronics Inc.: "Inter-RAT Intra-5G CN mobility between NR and LTD," R2-1706808, 3GPP TSG-RAN WG2 NR Adhoc, Qingdao, China, Jun. 27, 2017, 2 pages.

Nokia: "GERAN-E-UTRAN interworking—Prioritisation of inter-RAT cells," GP-071307, 3GPP TSG GERAN#35, Dublin, Ireland, Aug. 27, 2007, 5 pages.

1st Chinese Office Action for Chinese Application No. 202010903728. 0, dated Jul. 9, 2021 (Jul. 9, 2021)—9 pages (English translation—7 pages).

2nd Chinese Office Action for Chinese Application No. 202010903728. 0, dated Sep. 29, 2021 (Sep. 29, 2021)—9 pages (English translation—7 pages).

3GPP TS 36.331, "3rd Generation Partnership Project; Technical Specification Group Radio Access Network; Evolved Universal Terrestrial Radio Access (E-UTRA); Radio Resource Control (RRC); Protocol specification (Release 14)," v14.30, Jun. 2017, 745 pages.

Ericsson et al., "Correction to default RRC message contents," 3GPP TSG-RAN WG5 Meeting #43, R5-092738, Vilnius, Lithuania, Apr. 20-24, 2009, 43 pages.

Huawei et al., "Discussion on handover between NR and E-UTRA," 3GPP TSG-RAN wg2# ah1807, R2-1810376, Montreal, Canada, Jul. 2-6, 2018, 5 pages.

Huawei, "Procedure of inter-RAT handover with CN change," 3GPP TSG-RAN Meeting #94, R3-162953, Reno, Nevada, USA, Nov. 14-18, 2016, 3 pages.

Huawei, "Procedure of inter-RAT handover without CN change," 3GPP TSG-RAN WG3 Meeting #94, R3-162952, Reno, Nevada, USA, Nov. 14-18, 2016, 3 pages.

Huawei, "TP for inter-system mobility cases," 3GPP TSG-RAN WG3 AH, R3-170309, Spokane, Washington, USA, Jan. 17-19, 2017, 1 page.

Qualcomm Inc. "Considerations on LTE connectivity to 5G-CN," 3GPP TSG-RAN2 Meeting #98, R2-1705743, Hangzhou, China, May 15-19, 2017, 3 pages.

Search Report received in European Application No. 23162570.8-1216 dated Jun. 29, 2023, 11 pages.

Search Report received in European Application No. 23162675.5-1216 dated Jul. 3, 2023, 11 pages.

* cited by examiner

MOBILITY MANAGEMENT METHOD, USER EQUIPMENT, AND NETWORK SIDE DEVICE

CROSS-REFERENCE TO RELATED APPLICATION

The present application is the U.S. national phase of PCT Application No. PCT/CN2018/098009 filed on Aug. 1, 2018, which claims a priority of the Chinese patent application No. 201710676645.0 filed on Aug. 9, 2017, which is incorporated herein by reference in its entirety.

TECHNICAL FIELD

The present disclosure relates to the field of communication technology, in particular to a mobility management method, a User Equipment (UE) and a network side device.

BACKGROUND

As is known to all, after a UE has accessed an Enhanced Long Term Evolution (eLTE) network and entered an idle/inactive state, the UE needs to perform network reselection. However, in the case that the eLTE network includes an Evolved Packet Core (EPC) and/or a $5^{th}$-Generation (5G) Next Generation Core (NGC), the core networks supported by the UE have different capabilities. When the cell network reselection is performed directly in accordance with detected Reference Signal Received Power (RSRP), an unavailable reselected cell network may easily occur. When the reselected network is unavailable, it is necessary to reselect the network again, resulting in a waste of signaling resources.

SUMMARY

In one aspect, the present disclosure provides in some embodiments a mobility management method, including: receiving core network information about each cell from a network side device, the core network information being used to indicate a type of a core network; and performing cell reselection in accordance with the type of the core network for each cell and a capability of a UE for supporting the core network when the UE is in an idle state.

In another aspect, the present disclosure provides in some embodiments a mobility management method, including transmitting core network information about each cell to a UE, the core network information being used to indicate a type of a core network so that the UE performs cell reselection in accordance with the core network information about each cell and a capability of the UE for supporting the core network when the UE is in an idle state.

In yet another aspect, the present disclosure provides in some embodiments a UE, including: a reception module configured to receive core network information about each cell from a network side device, the core network information being used to indicate a type of a core network; and a reselection processing module configured to, when a UE is in an idle state, perform cell reselection in accordance with the type of the core network for each cell and a capability of the UE for supporting the core network.

In still yet another aspect, the present disclosure provides in some embodiments a network side device, including a transmission module configured to transmit core network information about each cell to a UE, the core network information being used to indicate a type of a core network so that the UE performs cell reselection in accordance with the core network information about each cell and a capability of the UE for supporting the core network when the UE is in an idle state.

In still yet another aspect, the present disclosure provides in some embodiments an electronic device, including one or more processors, a memory, and one or more programs stored in the memory and executed by the one or more processors so as to implement the above-mentioned mobility management method.

In still yet another aspect, the present disclosure provides in some embodiments a computer-readable storage medium storing therein a computer program. The computer program is executed by a processor so as to implement the above-mentioned mobility management method.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
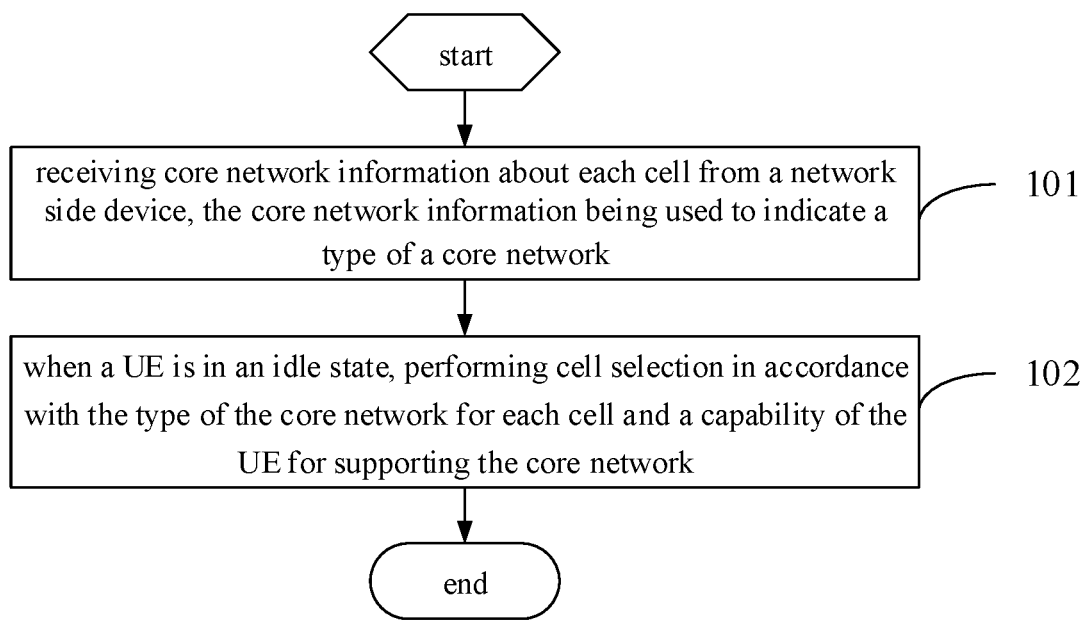
FIG. 1 is a flow chart of a mobility management method according to one embodiment of the present disclosure.

The present disclosure provides in some embodiments a mobility management method which, as shown in FIG. 1, includes the following steps.

Step 101: receiving core network information about each cell from a network side device, the core network information being used to indicate a type of a core network.

The mobility management method in the embodiments of the present disclosure may be applied to a UE, so as to perform mobility management over the UE, including performing network reselection for the UE in an idle state and cell handover for the UE in a connected state.

To be specific, the network side device may transmit the core network information about each cell to the UE, so as to indicate the type of the core network connected to each cell. The type of the core network may include an eLTE cell, an LTE cell and a 5G New Radio (NR) cell. The network side device may transmit the core network information to the UE via system broadcasting or dedicated signaling. Upon the receipt of the core network information about each cell, the UE may store the type of the core network for each cell. It should be appreciated that, the core network information received by the UE may be core network information transmitted by a source cell (i.e., a source access cell) and any other cell via system broadcasting, or core network information transmitted by the source cell via dedicated signaling.

Step 102: when the UE is in the idle state, performing cell reselection in accordance with the core network information about each cell and a capability of the UE for supporting the core network.

In this step, there are the following circumstances when the UE in the idle/inactive state performs the cell reselection. When the UE was previously in an eLTE connected state and currently in the eLTE idle/inactive state after the connection release, a reselected target cell may be an eLTE cell (NGC Non-Access Stratum (NAS)). When the UE was previously in the eLTE connected state and currently in the eLTE idle/inactive state after the connection release, a reselected target cell may be an LTE cell (EPC NAS). When the UE was previously in the LTE connected state and currently in the LTE idle/inactive state after the connection release, a reselected target cell may be an eLTE cell (NGC NAS). When the UE was previously in the LTE connected state and currently in the LTE idle/inactive state after the connection release, a reselected target cell may be an LTE cell (EPC NAS).

To be specific, the capability of the UE for supporting the core network may refer to a core network capable of being supported by the UE. The UE may select a cell connected to the core network capable of being supported by the UE as the reselected cell in accordance with the type of the core network for each cell, and perform attachment to the reselected cell.

In the embodiments of the present disclosure, the core network information about each cell may be received from the network side device, and the core network information may be used to indicate the type of the core network. When the UE is in the idle state, the cell reselection may be performed in accordance with the type of the core network connected to each cell and the capability of the UE for supporting the core network. Because the UE may select the cell connected to the core network capable of being supported by the UE itself as the reselected cell and perform attachment to the reselected cell, it is able to prevent the waste of signaling resources caused when the reselected cell is inappropriate and an access is initiated again.

Figure 2:
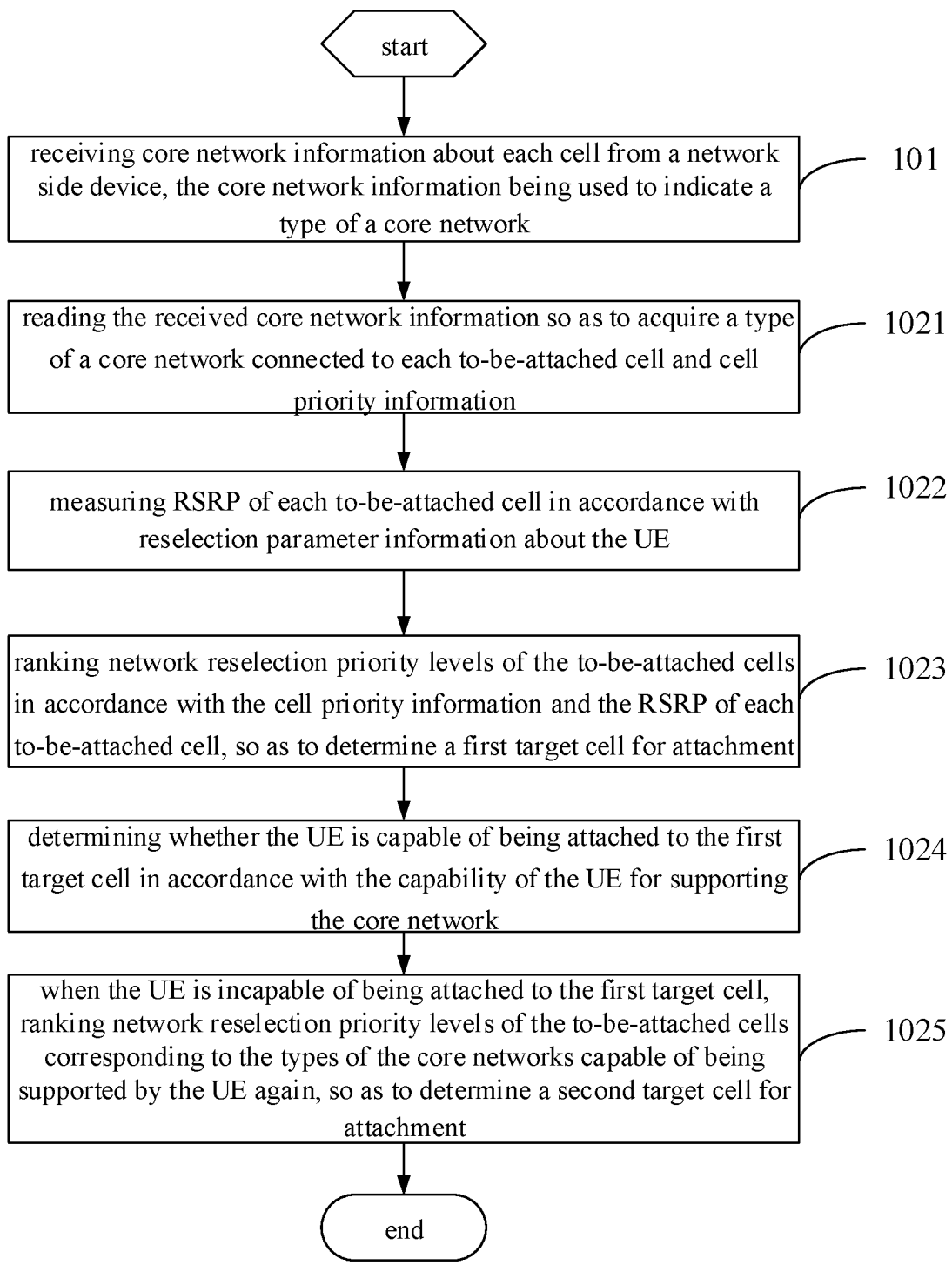
FIG. 2 is another flow chart of the mobility management method according to one embodiment of the present disclosure.

A procedure of the network reselection will be described in more details with reference to FIG. 2. As shown in FIG. 2, Step 102 may include the following steps.

Step 1021: reading the received core network information so as to acquire a type of a core network connected to each to-be-attached cell and cell priority information.

In this step, the core network information transmitted by the network side device in the source cell may also be used to indicate the cell priority information. It should be appreciated that, the core network information received by the UE may be core network information transmitted by the network side device in the source cell (i.e., the source access cell) or any other cell via system broadcasting, or core network information transmitted by the network side device in the source cell via dedicated signaling. In the embodiments of the present disclosure, when the UE has received the core network information transmitted by the network side device via system broadcasting and the core network information transmitted by the network side device via dedicated signaling simultaneously, the cell priority information received via dedicated signaling may have a priority level greater than the cell priority information received via system broadcasting. Alternatively, the cell priority information received via dedicated signaling and the cell priority information received via system broadcasting may take effect chronologically.

The cell priority information may be used to indicate an absolute priority level or a relative priority level of each to-be-attached cell. The relative priority level may include an offset value based on the type of the core network, an offset value based on a frequency, or an offset value based on an identification number of the cell. The following description will be given when the relative priority level is the offset value based on the type of the core network. When there are three types of core network for each cell, an offset value may be preset with respect to each type of core network, e.g., an offset value for type 1 may be 20, an offset value for type 2 may be 50, and an offset value for type 3 may be 100. The absolute priority level may include a priority level set in accordance with the type of the core network, a priority level set in accordance with the identification number of each to-be-attached cell, or a priority level set in accordance with the frequency of each to-be-attached cell. The following description will be given when the absolute priority level is the priority level set in accordance with the type of the core network. When there are three types of core network for each cell, an absolute priority level may be preset with respect to each type of core network, e.g., a priority level of the core network in type 1 may be level 1, a priority level of the core network in type 2 may be level 2, and a priority level of the core network in type 3 may be level 3.

Step 1022: measuring RSRP of each to-be-attached cell in accordance with reselection parameter information about the UE.

In this step, contents in the reselection parameter information may be set according to the practical need, and thus will not be particularly defined herein. The UE may measure the RSRP of each to-be-attached cell in accordance with the reselection parameter information.

Step 1023: ranking network reselection priority levels of the to-be-attached cells in accordance with the cell priority information and the RSRP of each to-be-attached cell, so as to determine a first target cell for attachment.

In this step, usually the first target cell may be a cell with a highest priority level. In the embodiments of the present disclosure, a mode for ranking the network reselection priority levels of the to-be-attached cells may be set according to the practical need.

For example, in a possible embodiment of the present disclosure, when the cell priority information includes the absolute priority level of each to-be-attached cell, the to-be-attached cells with a same absolute priority level may be ranked in accordance with the RSRP of each to-be-attached cell, and then the to-be-attached cell with a highest priority level may be selected as the first target cell for attachment in accordance with a ranking result. In the embodiments of the present disclosure, merely the to-be-attached cells with the highest priority level may be ranked in accordance with the RSRP of each to-be-attached cell, or all the to-be-attached cells may be ranked in accordance with the RSRP of each to-be-attached cell, which will not be particularly defined herein. For example, core networks having a type 1 and a priority level 1 may include a core network A, a core network B and a core network C, core networks having a type 2 and a priority level 2 may include a core network D, a core network E and a core network F, and core networks having a type 3 and a priority level 3 may include a core network G, a core network H and a core network I. The core networks having the priority level 1 are the core networks with the highest priority level, so in the embodiments of the present disclosure, merely the core network A, the core network B and the core network C may be ranked so as to acquire the core network with the highest priority level, thereby to determine a cell corresponding to the core network with the highest priority level as the first target cell. It should be appreciated that, no matter how the core network A, the core network B and the core network C are ranked, their priority levels may be higher than those of the core network D, the core network E and the core network F. When the searched to-be-attached cells include cells corresponding to the core network D, the core network E, the core network F, the core network G, the core network H and the core network I rather than cells corresponding to the core network A, the core network B and the core network C, the core network D, the core network E and the core network F may be ranked, so as to acquire the core network with the highest priority level and determine the first target cell.

In another possible embodiment of the present disclosure, when the cell priority information includes the relative priority level of each to-be-attached cell and the relative priority level is the offset value based on the type of the core network, a sum of the RSRP of each to-be-attached cell and the corresponding offset value based on the type of the core network may be calculated, then the priority levels of the to-be-attached cells may be ranked in accordance with the acquired sums, and then the to-be-attached cell with the highest priority level may be selected as the first target cell for attachment in accordance with a ranking result. Actually, the sum may also be considered as being acquired through adding the offset value to the RSRP, i.e., the sum may be a size of the RSRP with the offset value.

Step 1024: determining whether the UE is capable of being attached to the first target cell in accordance with the capability of the UE for supporting the core network.

In this step, after the first target cell has been determined, the core network capable of being supported by the UE may be acquired, and then whether a core network corresponding to the first target cell is the core network capable of being supported by the UE may be determined. When the core network corresponding to the first target cell is just the core network capable of being supported by the UE, it may be determined that the UE is capable of being attached to the first target cell. When the core network corresponding to the first target cell is not the core network capable of being supported by the UE, it may be determined that the UE is incapable of being attached to the first target cell.

Step 1025: when the UE is incapable of being attached to the first target cell, ranking network reselection priority levels of the to-be-attached cells corresponding to the types of the core networks capable of being supported by the UE again, so as to determine a second target cell for attachment.

In the embodiments of the present disclosure, when the UE is incapable of being attached to the first target cell, priority levels of the to-be-attached cells may be ranked again, so that the UE is to be attached to a reselected cell. At this time, the to-be-attached cells corresponding to the types of the core networks capable of being supported by the UE may be extracted, and the priority levels of the to-be-attached cells may ranked, so as to select the to-be-attached cell with the highest priority level from the to-be-attached cells corresponding to the types of the core networks capable of being supported by the UE as the second target cell for attachment. It should be appreciated that, a priority level ranking rule may be the same as that mentioned hereinabove, and thus will not be particularly defined herein.

In the embodiments of the present disclosure, the type of the core network for the to-be-attached cell with the highest priority level may be compared with the types of the core networks capable of being supported by the UE, and when the UE does not support the type of the core network for the to-be-attached cell with the highest priority level, network reselection priority levels of the to-be-attached cells corresponding to the types of the core networks capable of being supported by the UE may be ranked again, so as to ensure that the selected to-be-attached cell is a cell with the highest priority level in the to-be-attached cells corresponding to the type of the core networks capable of being supported by the UE, and ensure that the UE is capable of normally accessing to the selected to-be-attached cell. As a result, it is able to prevent the waste of signaling resources caused when the UE is attached to an inappropriate cell and an access is initiated again.

It should be appreciated that, usually there is a plurality of to-be-attached cells, and the plurality of to-be-attached cells may include intra-frequency cells and/or inter-frequency cells.

It should be appreciated that, in order to ensure the UE to perform communication normally, subsequent to determining the target cell for attachment, when a type of a core network corresponding to the target cell is different from a type of a core network corresponding to a cell to which the UE currently accesses, the method may further include transmitting an NAS update notification message to the network side device in the source cell, and the NAS update notification message may include the type of the core network corresponding to the target cell.

Further, the reselection priority levels of the to-be-attached cells may be invalid when a predetermined condition has been met. The predetermined condition may include at least one of a situation where the UE has entered in the connected state, a situation where an effective time set for the reselection priority level of each to-be-attached cell has elapsed, and a situation where the UE starts to search networks again.

In the embodiments of the present disclosure, the valid time of the reselection priority levels of the to-be-attached cells have been defined, so as to ensure the validity of the reselection priority levels of the to-be-attached cells, thereby to prevent the UE from being attached to an inappropriate reselected cell when the reselection priority level is invalid with the elapse of time.

Figure 3:
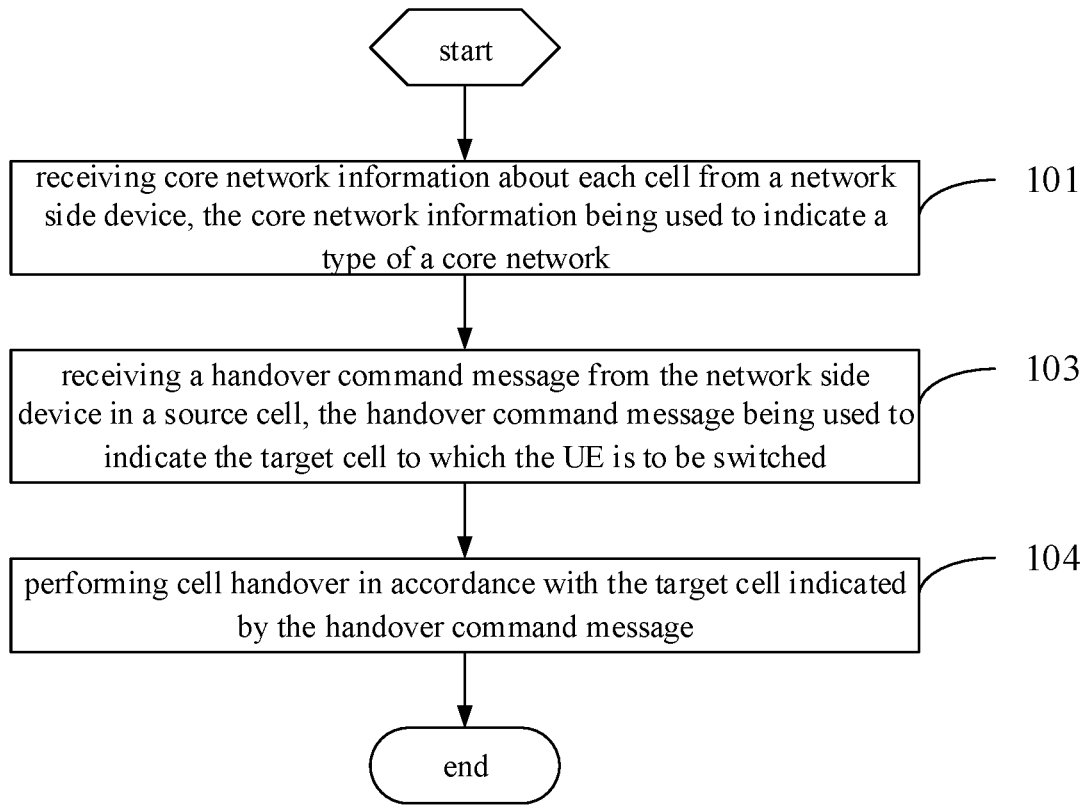
FIG. 3 is yet another flow chart of the mobility management method according to one embodiment of the present disclosure.

Further, apart from the network reselection in the idle state, the UE may also perform cell handover in the connected state. To be specific, as shown in FIG. 3, subsequent to Step 101, the method may further include: Step 103 of receiving a handover command message from the network side device in the source cell, the handover command message being used to indicate the target cell to which the UE is to be switched; and Step 104 of performing cell handover in accordance with the target cell indicated by the handover command message.

In the embodiments of the present disclosure, the handover command message may be used to explicitly or implicitly indicate identification information about the target cell, so that the UE acquires the to-be-switched target cell.

Then, the cell handover may be performed in accordance with a cell handover process. Due to the various types of source cells and target cells, there may exist various implements modes for the cell handover. In the embodiments of the present disclosure, the source cell may be an eLTE cell connected to a 5G core network, a 5G NR cell or an LTE cell. The target cell may be an eLTE cell connected to the 5G core network, a 5G NR cell or an LTE cell. The various handover scenarios for the source cell and the target cell will be described hereinafter in more details.

In a first scenario, the source cell may be an eLTE cell, the target cell may be an NR cell, and a cell handover message may be an Evolved Universal Mobile Telecommunications System (UMTS) Terrestrial Radio Access Network (EUTRAN) handover command message. The EUTRAN handover command message may carry an air-interface configuration parameter and an NR air-interface Radio Access Technology (RAT) type indicator of the target cell. In addition, the EUTRAN handover command message may carry or not carry information about core-network-related security parameters.

In this scenario, the UE may be switched from the eLTE cell to the NR cell, and the core network may remain unchanged. For the handover from EUTRAN, the following configuration may be used:

core network is not changed, the NAS security parameter may not be updated, and Message Container may be optional.

In a second scenario, the source cell may be an NR cell and the target cell may be an eLTE cell. Subsequent to receiving the handover command message from the network side device in the source cell, the method may further include receiving a Radio Resource Control (RRC) reconfiguration message from the network side device in the source cell. When the target cell and the source cell belong to different core networks, the RRC reconfiguration message may carry an air-interface configuration parameter of the target cell and an Information Element (IE) of the core network information about the target cell. When the target cell and the source cell belong to the same core network, the RRC reconfiguration information may carry the air-interface configuration parameter of the target cell, and may carry or not carry the IE of the core network information about the target cell.

In this scenario, the UE may be switched from the NR cell to the eLTE cell, and the core network may remain unchanged. For the handover from EUTRAN, the following configuration may be used:

```
Handover ::=                SEQUENCE {
targetRAT- Type             ENUMERATED {
                               utra, geran, cdma2000-1XRTT,
cdma2000-HRPD,NewRadio
                               spare4, spare3,           spare2,
spare1, ...},
    targetRAT-MessageContainer    OCTET STRING,
    nas-SecurityParamFromEUTRA OCTET STRING (SIZE (1)) OPTIONAL, --
Cond   UTRAGERANNR
    systemInformation           SI-OrPSI-GERAN   OPTIONAL -
    Cond PSHO
    }
```

As mentioned above, MobilityFromEUTRACommand may be modified: an NR RAT indicator may be added, and an NR may be added under Condition. However, when the

```
RRCConnectionReconfiguration-r8-IEs ::= SEQUENCE {
measConfig           MeasConfig              OPTIONAL,-- Need ON
mobilityControlInfo  MobilityControlInfo     OPTIONAL,-- Cond HO
dedicatedInfoNASList       SEQUENCE (SIZE(1..maxDRB)) OF
                           DedicatedInfoNAS      OPTIONAL,-- Cond nonHO
radioResourceConfigDedicated         RadioResourceConfigDedicated
    OPTIONAL, -- Cond HO-toEUTRA
securityConfigHO     SecurityConfigHO        OPTIONAL,-- Cond HO
nonCriticalExtension         RRCConnectionReconfiguration-v890-IEs
    OPTIONAL
}
Security config
SecurityConfigHO ::=                SEQUENCE {
    handoverType                    CHOICE {
        intraLTE                        SEQUENCE {
            securityAlgorithmConfig         SecurityAlgorithmConfig
OPTIONAL,-- Cond fullConfig
            keyChangeIndicator              BOOLEAN,
            nextHopChainingCount            NextHopChainingCount
    },
        interRAT                        SEQUENCE {
            securityAlgorithmConfig         SecurityAlgorithmConfig,
optional, cond NR to eLTE
```

```
            nas-SecurityParamToEUTRA    OCTET  STRING  (SIZE(6))
ptional,  cond NR to eLTE
        }
    }
```

As mentioned above, because the core network remains unchanged, for the handover (HO) from the NR cell to the eLTE cell, the NAS-related security information may not be carried.

In a third scenario, the source cell may be an LTE cell and the target cell may be an eLTE cell connected to a 5G core network, or the source cell may be an eLTE cell connected to the 5G core network and the target cell may be the LTE cell. Subsequent to receiving the handover command message from the network side device in the source cell, the method may further include receiving the RRC reconfiguration message from the network side device in the source cell. The RRC reconfiguration message needs to carry the air-interface configuration parameter of the target cell and an IE of core network security-related information about the target cell.

In this scenario, the UE may be switched between the LTE cell and the eLTE cell, and the core network may be changed. Depending on classification, the HO may be an intra-RAT (LTE) HO, but it is necessary to change the core network. When the eLTE cell and the LTE cell are a same air-interface cell and connected to different types of core networks, it is unnecessary to reconfigure air-interface resources. In other words, the RRC reconfiguration message may merely carry the IE of the core network security-related information about the target cell.

In the third scenario, SecurityConfigHO may be configured as follows:

```
SecurityConfigHO ::=            SEQUENCE {
    handoverType                CHOICE {
        intraLTE                SEQUENCE {
            securityAlgorithmConfig    SecurityAlgorithmConfig
OPTIONAL,-- Cond fullConfig
            keyChangeIndicator         BOOLEAN,
            nextHopChainingCount       NextHopChainingCount
            securityAlgorithmConfig    SecurityAlgorithmConfig,
optional cond eLTE HO
            nas-SecurityParamToEUTRA   OCTET STRING (SIZE(6))
optional cond eLTE HO
        },
        interRAT                SEQUENCE {
            securityAlgorithmConfig    SecurityAlgorithmConfig,
optional cond NR to eLTE
            nas-SecurityParamToEUTRA   OCTET STRING (SIZE(6))
optional cond NR to eLTE
        }
    }
```

In addition, for the intra-cell HO, in order to achieve load balancing, the handover process may be initiated by the network side device itself, so as to change the type of the core network for the UE in the eLTE cell. At this time, it is necessary to add an IE of the updated core network information in an intra-RAT field.

The present disclosure further provides in some embodiments a mobility management method, including transmitting core network information about each cell to a UE, the core network information being used to indicate a type of a core network so that the UE performs cell reselection in accordance with the core network information about each cell and a capability of the UE for supporting the core network when the UE is in an idle state.

The mobility management method in the embodiments of the present disclosure may be applied to a network side device, so as to perform mobility management over the UE, including performing network reselection for the UE in the idle state and cell handover for the UE in a connected state.

A communication procedure between the network side device and the UE may refer to that mentioned hereinabove, and thus will not be particularly defined herein.

In a possible embodiment of the present disclosure, the core network information may also be used to indicate cell priority information, and the cell priority information may be used for the UE to determine a priority level of each to-be-attached cell and determine a target to-be-attached cell for attachment.

In the embodiments of the present disclosure, the cell priority information may include an absolute priority level or a relative priority level of each to-be-attached cell. The relative priority level may include an offset value based on the type of the core network, an offset value based on a frequency, and an offset value based on an identification number of a cell. The absolute priority level may include a priority level set in accordance with the type of the core network, a priority level set in accordance with an identification number of each to-be-attached cell, or a priority level set in accordance with a frequency of each to-be-attached cell.

To be specific, the core network information may be a message transmitted by the network side device via system broadcasting and/or a message transmitted by the network side device via dedicated signaling.

Subsequent to transmitting the core network information about each cell to the UE, the method may further include: determining a type of a core network used by a target cell to which the UE is to be switched; and transmitting a handover command message to the UE in accordance with the determined type of the core network. The handover command message may be used to indicate the target cell to which the UE is to be switched, so as to enable the UE to perform cell handover.

In the embodiments of the present disclosure, the network side device may determine the type of the core network used by the target cell to which the UE is to be switched, and then determine the target cell to which the UE is to be switched. A rule for determining the type of the core network used by the target cell may be set according to the practical need, and thus will not be particularly defined herein. For example, the type of the core network to be switched may preferentially remain unchanged, so as to ensure the service continuity. A source cell for cell handover may be an eLTE cell connected to a 5G core network, a 5G NR cell or an LTE cell, and the target cell may be an eLTE cell connected to a 5G core network, a 5G NR cell or an LTE cell. Various handover scenarios for the source cell and the target cell will be described hereinafter in more details.

In a first scenario, the source cell may be an eLTE cell, the target cell may be an NR cell, and a cell handover message may be an EUTRAN handover command message. The EUTRAN handover command message may carry an air-interface configuration parameter and an NR air-interface RAT type indicator of the target cell. In addition, the EUTRAN handover command message may carry or not carry information about core-network-related security parameters.

In a second scenario, the source cell may be an NR cell and the target cell may be an eLTE cell. Subsequent to transmitting the handover command message to the UE, the method may further include transmitting an RRC reconfiguration message to the UE. When the target cell and the target cell belong to different core networks, the RRC reconfiguration message may carry an air-interface configuration parameter of the target cell and an IE of the core network information about the target cell. When the target cell and the source cell belong to the same core network, the RRC reconfiguration information may carry the air-interface configuration parameter of the target cell, and may carry or not carry the IE of the core network information about the target cell.

In a third scenario, the source cell may be an LTE cell and the target cell may be an eLTE cell connected to a 5G core network, or the source cell may be an eLTE cell connected to the 5G core network and the target cell may be the LTE cell. Subsequent to transmitting the handover command message to the UE, the method may further include transmitting the RRC reconfiguration message to the UE. The RRC reconfiguration message needs to carry the air-interface configuration parameter of the target cell and an IE of core network security-related information about the target cell.

In this scenario, when the eLTE cell and the LTE cell are a same air-interface cell and connected to different types of core networks, it is unnecessary to reconfigure air-interface resources. In other words, the RRC reconfiguration message may merely carry the IE of the core network security-related information about the target cell.

According to the embodiments of the present disclosure, the core network information about each cell may be transmitted to the UE, and the core network information may be used to indicate the type of the core network, so that the UE performs cell reselection in accordance with the core network information about each cell and the capability of the UE for supporting the core network when the UE is in the idle state. Because the core network information about each cell is transmitted by the network side device to the UE, it is able for the UE to select the cell corresponding to the core network and capable of being supported by the UE itself as the reselected cell for attachment, thereby to prevent the waste of signaling resources caused when the reselected cell is inappropriate and an access is initiated again.

Figure 4:
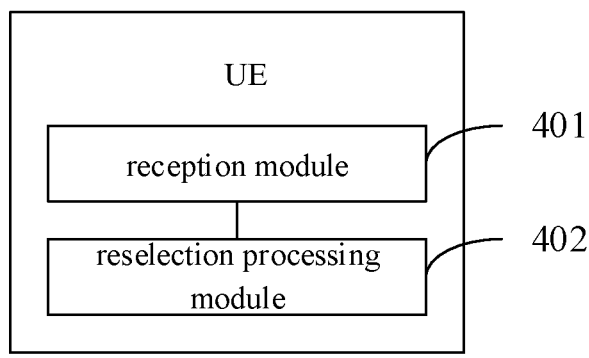
FIG. 4 is a schematic view showing a UE according to one embodiment of the present disclosure.

As shown in FIG. 4, the present disclosure further provides in some embodiments a UE capable of implementing the above-mentioned mobility management method with a same technical effect. As shown in FIG. 4, the UE may include: a reception module 401 configured to receive core network information about each cell from a network side device, the core network information being used to indicate a type of a core network; and a reselection processing module 402 configured to, when a UE is in an idle state, perform cell reselection in accordance with the type of the core network for each cell and a capability of the UE for supporting the core network.

Figure 5:
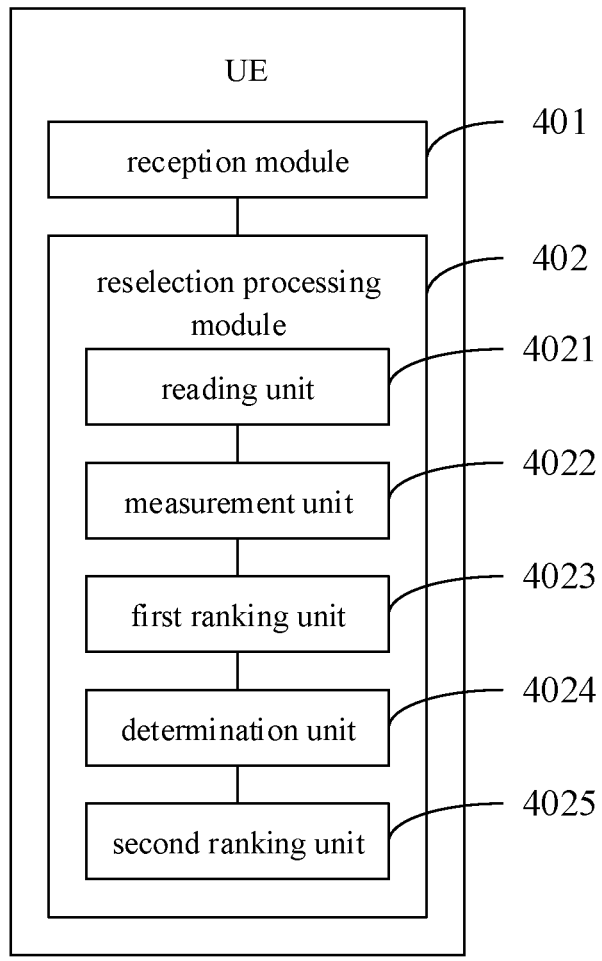
FIG. 5 is another schematic view showing the UE according to one embodiment of the present disclosure.

In a possible embodiment of the present disclosure, as shown in FIG. 5, the core network information transmitted by the network side device in a source cell may also be used to indicate cell priority information. The reselection processing module 402 may include: a reading unit 4021 configured to read the received core network information so as to acquire a type of a core network and the cell priority information corresponding to each to-be-attached cell; a measurement unit 4022 configured to measure RSRP of each to-be-attached cell in accordance with reselected parameter information of the UE; a first ranking unit 4023 configured to rank network reselection priority levels of the to-be-attached cells in accordance with the cell priority information and the RSRP of each to-be-attached cell, so as to determine a first target cell for attachment; a determination unit 4024 configured to determine whether the UE is capable of being attached to the first target cell in accordance with the capability of the UE for supporting the core network; and a second ranking unit 4025 configured to, when the UE is incapable of being attached to the first target cell, rank the network reselection priority levels of the to-be-attached cells corresponding to the type of the core network capable of being supported by the UE, so as to determine a second target cell for attachment.

In a possible embodiment of the present disclosure, the cell priority information may include an absolute priority level or a relative priority level of each to-be-attached cell.

In a possible embodiment of the present disclosure, the relative priority level may include an offset value based on the type of the core network, an offset value based on a frequency, or an offset value based on an identification number of each cell.

In a possible embodiment of the present disclosure, the absolute priority level may include a priority level set in accordance with the type of the core network, a priority level set in accordance with an identification number of each to-be-attached cell, or a priority level set in accordance with a frequency of each to-be-attached cell.

In a possible embodiment of the present disclosure, the to-be-attached cells may include intra-frequency cells and/or inter-frequency cells.

In a possible embodiment of the present disclosure, when the cell priority information includes the absolute priority level of each to-be-attached cell, the first ranking unit is further configured to: rank the to-be-attached cells with a same absolute priority level in accordance with the RSRP of each to-be-attached cell; and select a to-be-attached cell with a highest priority level as the first target cell for attachment in accordance with a ranking result.

In a possible embodiment of the present disclosure, when the cell priority information includes the relative priority level of each to-be-attached cell and the relative priority level is the offset value based on the type of the core network, the first ranking unit may include: a calculation sub-unit configured to calculate a sum of the RSRP of each to-be-attached cell and the corresponding offset value based on the type of the core network; a ranking sub-unit configured to rank priority levels of the to-be-attached cells in accordance with the acquired sums; and a determination sub-unit configured to determine a to-be-attached cell with a highest priority level as the first target cell for attachment in accordance with a ranking result.

In a possible embodiment of the present disclosure, the UE may further include a message transmission module configured to transmit an NAS update notification message to the network side device in the source cell. The NAS update notification message may include a type of a core network corresponding to the target cell.

In a possible embodiment of the present disclosure, the core network information may be a message transmitted by the network side device via system broadcasting and/or a message transmitted by the network side device via dedicated signaling.

In a possible embodiment of the present disclosure, the cell priority information received via dedicated signaling may have a priority level higher than the cell priority information received via system broadcasting, or the cell priority information received via dedicated signaling and the cell priority information received via system broadcasting may take effect chronologically.

In a possible embodiment of the present disclosure, the UE may further include a handover processing module. The reception module is further configured to receive a handover command message from the network side device in the source cell, and the handover command message may be used to indicate a target cell for handover to the UE. The handover processing module is configured to perform cell handover in accordance with the target cell indicated in the handover command message.

In a possible embodiment of the present disclosure, the source cell may be an eLTE cell connected to a 5G core network, a 5G NR cell or an LTE cell, and the target cell may be an eLTE cell connected to the 5G core network, a 5G NR cell or an LTE cell.

In a possible embodiment of the present disclosure, when the source cell is an eLTE cell and the target cell is an NR cell, a cell handover message may be an EUTRAN handover command message carrying an air-interface configuration parameter and an NR air-interface RAT type indicator of the target cell. The EUTRAN handover command message may carry or not carry information about core-network-related security parameters.

In a possible embodiment of the present disclosure, when the source cell is an NR cell and the target cell is an eLTE cell, the reception module is further configured to receive an RRC reconfiguration message from the network side device in the source cell. When the target cell and the source cell belong to different core networks, the RRC reconfiguration message may carry the air-interface configuration parameter of the target cell and an IE of the core network information about the target cell, and when the target cell and the source cell belong to a same core network, the RRC reconfiguration message may carry the air-interface configuration parameter of the target cell, and may carry or not carry the IE of the core network information about the target cell.

In a possible embodiment of the present disclosure, when the source cell is an LTE cell and the target cell is an eLTE cell connected to a 5G core network, or when the source cell is an eLTE cell connected to a 5G core network and the target cell is an LTE cell, the reception module is further configured to receive an RRC reconfiguration message from the network side device in the source cell, and the RRC reconfiguration message may carry the air-interface configuration parameter of the target cell and an IE of core network security-related information about the target cell.

In a possible embodiment of the present disclosure, when the source cell is an LTE cell and the target cell is an eLTE cell connected to a 5G core network, or when the source cell is an eLTE cell connected to a 5G core network and the target cell is an LTE cell, and the target cell and the source cell are a same cell, the reception module is further configured to receive an RRC reconfiguration message from the network side device in the source cell, and the RRC reconfiguration message may carry the IE of the core network security-related information about the target cell.

In a possible embodiment of the present disclosure, the reselection priority levels of the to-be-attached cells may be invalid when a predetermined condition has been met. The predetermined condition may include at least one of a situation where the UE has entered in a connected state, a situation where an effective time set for the reselection priority level of each to-be-attached cell has elapsed, or a situation where the UE starts to search networks again.

According to the embodiments of the present disclosure, the core network information about each cell may be received from the network side device, and the core network information may be used to indicate the type of the core network. When the UE is in the idle state, the cell reselection may be performed in accordance with the type of the core network connected to each cell and the capability of the UE for supporting the core network. Because the UE may select the cell connected to the core network capable of being supported by the UE itself as the reselected cell and perform attachment to the reselected cell, it is able to prevent the waste of signaling resources caused when the reselected cell is inappropriate and an access is initiated again.

The present disclosure further provides in some embodiments a network side device, including a transmission module configured to transmit core network information about each cell to a UE, the core network information being used to indicate a type of a core network so that the UE performs cell reselection in accordance with the core network information about each cell and a capability of the UE for supporting the core network when the UE is in an idle state.

In a possible embodiment of the present disclosure, the core network information may be further used to indicate cell priority information, and the cell priority information may be used for the UE to determine a priority level of each to-be-attached cell and determine a target to-be-attached cell for attachment.

In a possible embodiment of the present disclosure, the cell priority information may include an absolute priority level or a relative priority level of each to-be-attached cell.

In a possible embodiment of the present disclosure, the relative priority level may include an offset value based on the type of the core network, an offset value based on a frequency, or an offset value based on an identification number of each cell.

In a possible embodiment of the present disclosure, the absolute priority level may include a priority level set in accordance with the type of the core network, a priority level set in accordance with an identification number of each to-be-attached cell, or a priority level set in accordance with a frequency of each to-be-attached cell.

In a possible embodiment of the present disclosure, the core network information may be a message transmitted by the network side device via system broadcasting and/or a message transmitted by the network side device via dedicated signaling.

In a possible embodiment of the present disclosure, the network side device may further include a determination module configured to determine a type of a core network used by a target cell to which the UE is to be switched. The transmission module is further configured to transmit a handover command message to the UE in accordance with the determined type of the core network, and the handover command message may be used to indicate a target cell for handover to the UE so as to enable the UE to perform cell handover.

In a possible embodiment of the present disclosure, the source cell may be an eLTE cell connected to a 5G core network, a 5G NR cell or an LTE cell, and the target cell may be an eLTE cell connected to the 5G core network, a 5G NR cell or an LTE cell.

In a possible embodiment of the present disclosure, when the source cell is an eLTE cell and the target cell is an NR cell, a cell handover message may be an EUTRAN handover command message carrying an air-interface configuration parameter and an NR air-interface RAT type indicator of the target cell. The EUTRAN handover command message may carry or not carry information about core-network-related security parameters.

In a possible embodiment of the present disclosure, when the source cell is an NR cell and the target cell is an eLTE cell, the transmission module is further configured to transmit an RRC reconfiguration message to the UE. When the target cell and the source cell belong to different core networks, the RRC reconfiguration message may carry the air-interface configuration parameter of the target cell and an IE of the core network information about the target cell, and when the target cell and the source cell belong to a same core network, the RRC reconfiguration message may carry the air-interface configuration parameter of the target cell, and may carry or not carry the IE of the core network information about the target cell.

In a possible embodiment of the present disclosure, when the source cell is an LTE cell and the target cell is an eLTE cell connected to a 5G core network, or when the source cell is an eLTE cell connected to a 5G core network and the target cell is an LTE cell, the transmission module is further configured to transmit an RRC reconfiguration message to the UE, and the RRC reconfiguration message may carry the air-interface configuration parameter of the target cell and an IE of core network security-related information about the target cell.

In a possible embodiment of the present disclosure, when the source cell is an LTE cell and the target cell is an eLTE cell connected to a 5G core network, or when the source cell is an eLTE cell connected to a 5G core network and the target cell is an LTE cell, and the target cell and the source cell are a same cell, the transmission module is further configured to transmit an RRC reconfiguration message to the UE, and the RRC reconfiguration message may carry the IE of the core network security-related information about the target cell.

According to the embodiments of the present disclosure, the core network information about each cell may be transmitted to the UE, and the core network information may be used to indicate the type of the core network, so that the UE performs cell reselection in accordance with the core network information about each cell and the capability of the UE for supporting the core network when the UE is in the idle state. Because the core network information about each cell is transmitted by the network side device to the UE, it is able for the UE to select the cell corresponding to the core network and capable of being supported by the UE itself as the reselected cell for attachment, thereby to prevent the waste of signaling resources caused when the reselected cell is inappropriate and an access is initiated again.

Figure 6:
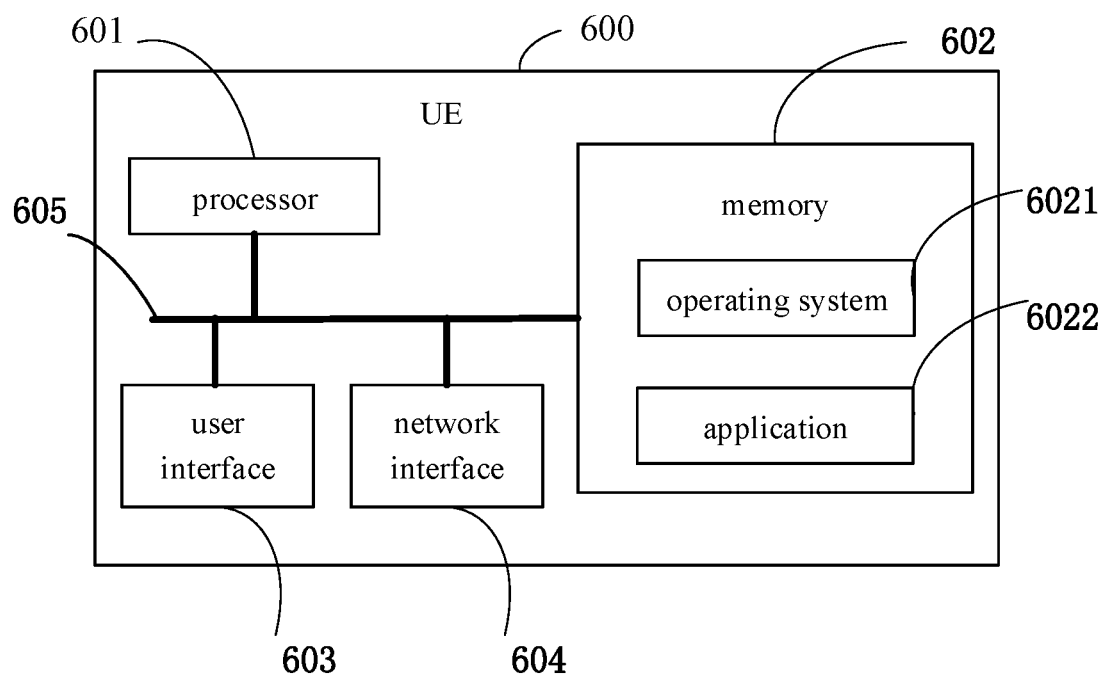
FIG. 6 is yet another schematic view showing the UE according to one embodiment of the present disclosure.

The present disclosure further provides in some embodiments a UE capable of implementing the above-mentioned mobility management method with a same technical effect. As shown in FIG. 6, the UE 600 may include at least one processor 601, a memory 602, at least one network interface 604 and a user interface 603. The components of the UE 600 may be coupled together through a bus system 605. It should be appreciated that, the bus system 605 is configured to achieve connection and communication among the components. Apart from a data bus, the bus system 605 may further include a power source bus, a control bus and a state signal bus. For clarification, all these buses in FIG. 6 may be collectively called as bus system 605.

The user interface 603 may include a display, a keyboard or a pointing device (e.g., mouse, track ball, touch plate or touch panel).

It should be appreciated that, the memory 602 may be a volatile memory, a nonvolatile memory or both. The nonvolatile memory may be a Read-Only Memory (ROM), a Programmable ROM (PROM), an Erasable PROM (EPROM), an electrically EPROM (EEPROM) or a flash memory. The volatile memory may be a Random Access Memory (RAM) which serves as an external high-speed cache. Illustratively but nonrestrictively, the RAM may include Static RAM (SRAM), Dynamic RAM (DRAM), Synchronous DRAM (SDRAM), Double Data Rate SDRAM (DDRSDRAM), Enhanced SDRAM (ESDRAM), Synchronous Link DRAM (SLDRAM) or Direct Rambus RAM (DRRAM). The memory 602 intends to include, but not limited to, the above-mentioned and any other appropriate memories.

In a possible embodiment of the present disclosure, the following elements may be stored in the memory 602: an executable module or data structure, a subset or an extended set thereof, an operating system 6021 and an application 6022.

The operating system 6021 may include various system programs, e.g., a framework layer, a core layer and a driving layer, so as to implement various basic services and process hardware-based tasks. The application 6022 may include various applications, e.g., Media Player and Browser, so as to implement various application services. The programs for implementing the above-mentioned method may be included in the application 6022.

In the embodiments of the present disclosure, the UE may further include a computer program stored in the memory 602 and executed by the processor 601, especially a computer program in the application 6022. The computer program is executed by the processor 601 so as to: receive core network information about each cell from a network side device, the core network information being used to indicate a type of a core network; and when a UE is in an idle state, perform cell selection in accordance with the type of the core network for each cell and a capability of the UE for supporting the core network.

The above-mentioned method may be applied to, or implemented by, the processor 601. The processor 601 may be an integrated circuit (IC) having a signal processing capability. During the implementation, the steps of the above-mentioned method may be completed through an integrated logic circuit of hardware in the processor 601 or instructions in the form of software. The processor 601 may be a general-purpose processor, a digital signal processor, an application-specific integrated circuit (ASIC), a field programmable gate array (FPGA) or any other programmable logic element, a discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as an RAM, a flash memory, an ROM, a PROM, an EEPROM, or a register. The storage medium may be located in the memory 602, and the processor 601 may read information stored in the memory 602 so as to implement the steps of the method in conjunction with the hardware.

It should be appreciated that, the embodiments of the present disclosure may be implemented by hardware, software, firmware, middleware, microcode or a combination thereof. For the hardware implementation, the processor may include one or more of an ASIC, a DSP, a DSP device (DSPD), a Programmable Logic Device (PLD), an FPGA, a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

In a possible embodiment of the present disclosure, the core network information transmitted by the network side device in a source cell may also be used to indicate cell priority information. The processor 601 is further configured to execute the computer program, so as to: read the received core network information so as to acquire a type of a core network and the cell priority information corresponding to each to-be-attached cell; measure RSRP of each to-be-attached cell in accordance with reselected parameter information of the UE; rank network reselection priority levels of the to-be-attached cells in accordance with the cell priority information and the RSRP of each to-be-attached cell, so as to determine a first target cell for attachment; determine whether the UE is capable of being attached to the first target cell in accordance with the capability of the UE for supporting the core network; and when the UE is incapable of being attached to the first target cell, ranking the network reselection priority levels of the to-be-attached cells corresponding to the type of the core network capable of being supported by the UE, so as to determine a second target cell for attachment.

In a possible embodiment of the present disclosure, the cell priority information may include an absolute priority level or a relative priority level of each to-be-attached cell.

In a possible embodiment of the present disclosure, the relative priority level may include an offset value based on the type of the core network, an offset value based on a frequency, or an offset value based on an identification number of each cell.

In a possible embodiment of the present disclosure, the absolute priority level may include a priority level set in accordance with the type of the core network, a priority level set in accordance with an identification number of each to-be-attached cell, or a priority level set in accordance with a frequency of each to-be-attached cell.

In a possible embodiment of the present disclosure, the to-be-attached cells may include intra-frequency cells and/or inter-frequency cells.

In a possible embodiment of the present disclosure, when the cell priority information includes the absolute priority level of each to-be-attached cell, the processor 601 is further configured to execute the computer program, so as to: rank the to-be-attached cells with a same absolute priority level in accordance with the RSRP of each to-be-attached cell; and select a to-be-attached cell with a highest priority level as the first target cell for attachment in accordance with a ranking result.

In a possible embodiment of the present disclosure, when the cell priority information includes the relative priority level of each to-be-attached cell and the relative priority level is the offset value based on the type of the core network, the processor 601 is further configured to execute the computer program, so as to: calculate a sum of the RSRP of each to-be-attached cell and the corresponding offset value based on the type of the core network; rank priority levels of the to-be-attached cells in accordance with the acquired sums; and determine a to-be-attached cell with a highest priority level as the first target cell for attachment in accordance with a ranking result.

In a possible embodiment of the present disclosure, the processor 601 is further configured to execute the computer program, so as to transmit an NAS update notification message to the network side device in the source cell. The NAS update notification message may include a type of a core network corresponding to the target cell.

In a possible embodiment of the present disclosure, the core network information may be a message transmitted by the network side device via system broadcasting and/or a message transmitted by the network side device via dedicated signaling.

In a possible embodiment of the present disclosure, the cell priority information received via dedicated signaling may have a priority level higher than the cell priority information received via system broadcasting, or the cell priority information received via dedicated signaling and the cell priority information received via system broadcasting may take effect chronologically.

In a possible embodiment of the present disclosure, the processor 601 is further configured to execute the computer program, so as to: receive a handover command message from the network side device in the source cell, the handover command message being used to indicate a target cell for handover to the UE; and perform cell handover in accordance with the target cell indicated in the handover command message.

In a possible embodiment of the present disclosure, the source cell may be an eLTE cell connected to a 5G core network, a 5G NR cell or an LTE cell, and the target cell may be an eLTE cell connected to the 5G core network, a 5G NR cell or an LTE cell.

In a possible embodiment of the present disclosure, when the source cell is an eLTE cell and the target cell is an NR cell, a cell handover message may be an EUTRAN handover command message carrying an air-interface configuration parameter and an NR air-interface RAT type indicator of the target cell. The EUTRAN handover command message may carry or not carry information about core-network-related security parameters.

In a possible embodiment of the present disclosure, when the source cell is an NR cell and the target cell is an eLTE cell, the processor 601 is further configured to execute the computer program, so as to receive an RRC reconfiguration message from the network side device in the source cell. When the target cell and the source cell belong to different core networks, the RRC reconfiguration message may carry the air-interface configuration parameter of the target cell and an IE of the core network information about the target cell, and when the target cell and the source cell belong to a same core network, the RRC reconfiguration message may carry the air-interface configuration parameter of the target cell, and may carry or not carry the IE of the core network information about the target cell.

In a possible embodiment of the present disclosure, when the source cell is an LTE cell and the target cell is an eLTE cell connected to a 5G core network, or when the source cell is an eLTE cell connected to a 5G core network and the target cell is an LTE cell, the processor 601 is further configured to execute the computer program, so as to receive an RRC reconfiguration message from the network side device in the source cell, and the RRC reconfiguration message may carry the air-interface configuration parameter of the target cell and an IE of core network security-related information about the target cell.

In a possible embodiment of the present disclosure, when the source cell is an LTE cell and the target cell is an eLTE cell connected to a 5G core network, or when the source cell is an eLTE cell connected to a 5G core network and the target cell is an LTE cell, and the target cell and the source cell are a same cell, the processor 601 is further configured to execute the computer program, so as to receive an RRC reconfiguration message from the network side device in the source cell, and the RRC reconfiguration message may carry the IE of the core network security-related information about the target cell.

In a possible embodiment of the present disclosure, the reselection priority levels of the to-be-attached cells may be invalid when a predetermined condition has been met. The predetermined condition may include at least one of a situation where the UE has entered a connected state, a situation where an effective time set for the reselection priority level of each to-be-attached cell has elapsed, and a situation where the UE starts to search networks again.

According to the embodiments of the present disclosure, the core network information about each cell may be received from the network side device, and the core network information may be used to indicate the type of the core network. When the UE is in the idle state, the cell reselection may be performed in accordance with the type of the core network connected to each cell and the capability of the UE for supporting the core network. Because the UE may select the cell connected to the core network capable of being supported by the UE itself as the reselected cell and perform attachment to the reselected cell, it is able to prevent the waste of signaling resources caused when the reselected cell is inappropriate and an access is initiated again.

Figure 7:
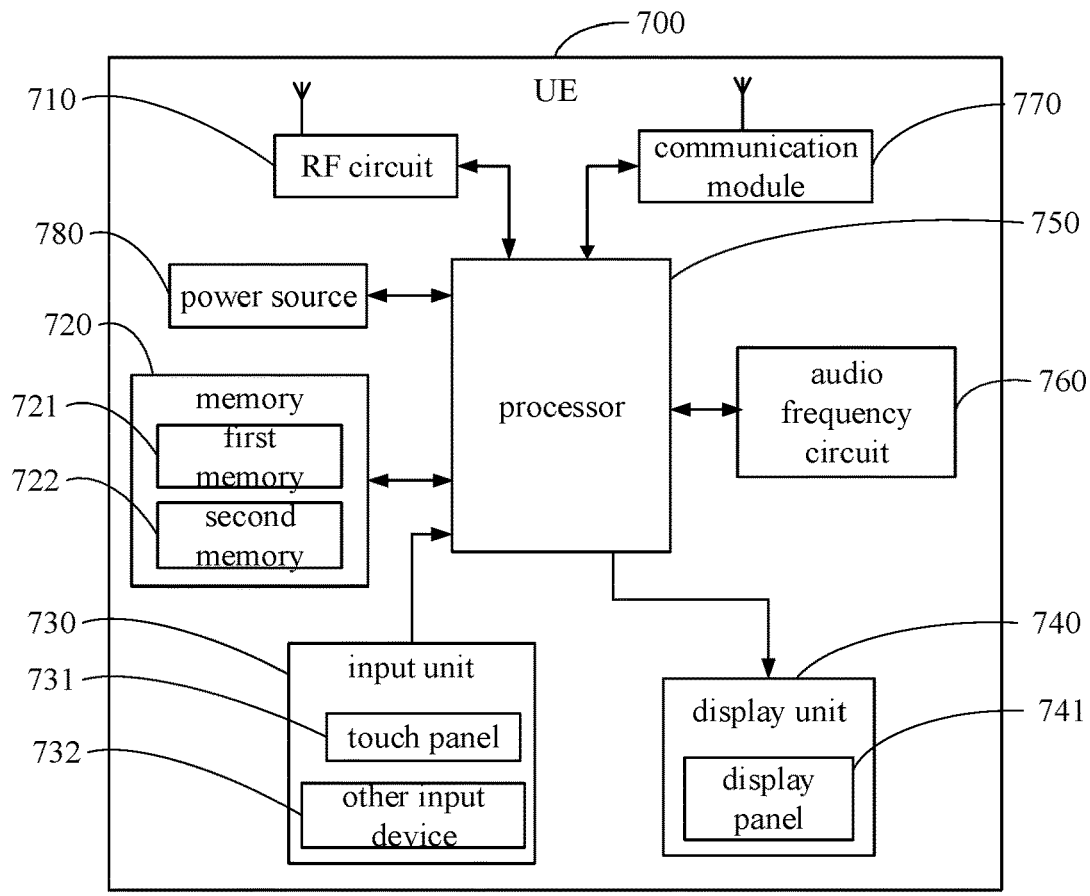
FIG. 7 is still yet another schematic view showing the UE according to one embodiment of the present disclosure.

The present disclosure further provides in some embodiments a UE capable of implementing the above-mentioned mobility management method with a same technical effect. As shown in FIG. 7, the UE 700 may include a Radio Frequency (RF) circuit 710, a memory 720, an input unit 730, a display unit 740, a processor 750, an audio frequency circuit 760, a communication module 770, a power source 780 and a camera.

The input unit 730 is configured to receive digital or character information inputted by a user, and generate a signal input related to user settings and function control of the UE 700. To be specific, the input unit 730 may include a touch panel 731. The touch panel 731, also called as touch screen, is configured to collect a touch operation made by the user on or in proximity to the touch panel (e.g., an operation made by the user through any appropriate object or attachment (e.g., finger or stylus) on or in the proximity to the touch panel 731), and drive a corresponding connection device in accordance with a predetermined program. The touch panel 731 may include a touch detection unit and a touch controller. The touch detection unit is configured to detect a touch position and a signal generated due to the touch operation, and transmit the signal to the touch controller. The touch controller is configured to receive touch information from the touch detection unit, convert it into coordinates of a touch point, transmit the coordinates to the processor 750, and receive and execute a command from the processor 750. In addition, the touch panel 731 may be of a resistive type, a capacitive type, an infrared type or a surface acoustic wave (SAW) type. Apart from the touch panel 731, the input unit 730 may further include an input device 732 which may include, but not limited to, a physical keyboard, a functional button (e.g., a volume control button or an on/off button), a trackball, a mouse, and a joystick, which will not be particularly defined herein.

The display unit 740 is configured to display information inputted by the user or information to be presented to the user, and various interfaces for the UE 700, and it may include a display panel 741. In a possible embodiment of the present disclosure, the display panel 741 may be a Liquid Crystal Display (LCD) panel or an Organic Light-Emitting Diode (OLED) panel.

It should be appreciated that, the touch panel 731 may cover the display panel 741, so as to form a touch display panel. When the touch operation made on or in proximity to the touch display panel has been detected, the touch information may be transmitted to the processor 750 so as to determine a type of a touch event. Then, the processor 750 may provide corresponding visual output on the touch display panel in accordance with the type of the touch event.

The touch display panel may include an application interface display region and a commonly-used controls display region. An arrangement mode of the two display regions will not be particularly defined herein, e.g., one of the two display regions may be arranged above or under the other, or arranged to the left or the right of the other. The application interface display region may be adopted to display interfaces for applications, and each interface may include an icon for at least one application and/or an interface element such as Widget desktop control. The application interface display region may also be a blank interface where no content is contained. The commonly-used controls display region may be adopted to display controls which are used frequently, e.g., setting button, interface number, scroll bar, or such application icons as telephone book icon.

In this embodiment, through calling a program or module stored in a first memory 721 and/or data stored in a second memory 722, the processor 750 is configured to: receive core network information about each cell from a network side device, the core network information being used to indicate a type of a core network; and when a UE is in an idle state, perform cell reselection in accordance with the type of the core network for each cell and a capability of the UE for supporting the core network.

In a possible embodiment of the present disclosure, the core network information transmitted by the network side device in a source cell may also be used to indicate cell priority information. The processor 750 is further configured to execute the computer program, so as to: read the received core network information so as to acquire a type of a core network and the cell priority information corresponding to each to-be-attached cell; measure RSRP of each to-be-attached cell in accordance with reselected parameter information of the UE; rank network reselection priority levels of the to-be-attached cells in accordance with the cell priority information and the RSRP of each to-be-attached cell, so as to determine a first target cell for attachment; determine whether the UE is capable of being attached to the first target cell in accordance with the capability of the UE for supporting the core network; and when the UE is incapable of being attached to the first target cell, ranking the network reselection priority levels of the to-be-attached cells corresponding to the type of the core network capable of being supported by the UE, so as to determine a second target cell for attachment.

In a possible embodiment of the present disclosure, the cell priority information may include an absolute priority level or a relative priority level of each to-be-attached cell.

In a possible embodiment of the present disclosure, the relative priority level may include an offset value based on the type of the core network, an offset value based on a frequency, or an offset value based on an identification number of each cell.

In a possible embodiment of the present disclosure, the absolute priority level may include a priority level set in accordance with the type of the core network, a priority level set in accordance with an identification number of each to-be-attached cell, or a priority level set in accordance with a frequency of each to-be-attached cell.

In a possible embodiment of the present disclosure, the to-be-attached cells may include intra-frequency cells and/or inter-frequency cells.

In a possible embodiment of the present disclosure, when the cell priority information includes the absolute priority level of each to-be-attached cell, the processor 750 is further configured to execute the computer program, so as to: rank the to-be-attached cells with a same absolute priority level in accordance with the RSRP of each to-be-attached cell; and select a to-be-attached cell with a highest priority level as the first target cell for attachment in accordance with a ranking result.

In a possible embodiment of the present disclosure, when the cell priority information includes the relative priority level of each to-be-attached cell and the relative priority level is the offset value based on the type of the core network, the processor 750 is further configured to execute the computer program, so as to: a calculate a sum of the RSRP of each to-be-attached cell and the corresponding offset value based on the type of the core network; rank priority levels of the to-be-attached cells in accordance with the acquired sums; and determine a to-be-attached cell with a highest priority level as the first target cell for attachment in accordance with a ranking result.

In a possible embodiment of the present disclosure, the processor 750 is further configured to execute the computer program, so as to transmit a NAS update notification message to the network side device in the source cell. The NAS update notification message may include a type of a core network corresponding to the target cell.

In a possible embodiment of the present disclosure, the core network information may be a message transmitted by the network side device via system broadcasting and/or a message transmitted by the network side device via dedicated signaling.

In a possible embodiment of the present disclosure, the cell priority information received via dedicated signaling may have a priority level higher than the cell priority information received via system broadcasting, or the cell priority information received via dedicated signaling and the cell priority information received via system broadcasting may take effect chronologically.

In a possible embodiment of the present disclosure, the processor 750 is further configured to execute the computer program, so as to: receive a handover command message from the network side device in the source cell, the handover command message being used to indicate a target cell for handover to the UE; and perform cell handover in accordance with the target cell indicated in the handover command message.

In a possible embodiment of the present disclosure, the source cell may be an eLTE cell connected to a 5G core network, a 5G NR cell or an LTE cell, and the target cell may be an eLTE cell connected to the 5G core network, a 5G NR cell or an LTE cell.

In a possible embodiment of the present disclosure, when the source cell is an eLTE cell and the target cell is an NR cell, a cell handover message may be an EUTRAN handover command message carrying an air-interface configuration parameter and an NR air-interface RAT type indicator of the target cell. The EUTRAN handover command message may carry or not carry information about core-network-related security parameters.

In a possible embodiment of the present disclosure, when the source cell is an NR cell and the target cell is an eLTE cell, the processor 750 is further configured to execute the computer program so as to receive an RRC reconfiguration message from the network side device in the source cell. When the target cell and the source cell belong to different core networks, the RRC reconfiguration message may carry the air-interface configuration parameter of the target cell and an IE of the core network information about the target cell, and when the target cell and the source cell belong to a same core network, the RRC reconfiguration message may carry the air-interface configuration parameter of the target cell, and may carry or not carry the IE of the core network information about the target cell.

In a possible embodiment of the present disclosure, when the source cell is an LTE cell and the target cell is an eLTE cell connected to a 5G core network, or when the source cell is an eLTE cell connected to a 5G core network and the target cell is an LTE cell, the processor 750 is further configured to execute the computer program, so as to receive an RRC reconfiguration message from the network side device in the source cell, and the RRC reconfiguration message may carry the air-interface configuration parameter of the target cell and an IE of core network security-related information about the target cell.

In a possible embodiment of the present disclosure, when the source cell is an LTE cell and the target cell is an eLTE cell connected to a 5G core network, or when the source cell is an eLTE cell connected to a 5G core network and the target cell is an LTE cell, and the target cell and the source cell are a same cell, the processor 750 is further configured to execute the computer program, so as to receive an RRC reconfiguration message from the network side device in the source cell, and the RRC reconfiguration message may carry the IE of the core network security-related information about the target cell.

In a possible embodiment of the present disclosure, the reselection priority levels of the to-be-attached cells may be invalid when a predetermined condition has been met. The predetermined condition may include at least one of a situation where the UE has entered in a connected state, a situation where an effective time set for the reselection priority level of each to-be-attached cell has elapsed, and a situation where the UE starts to search networks again.

According to the embodiments of the present disclosure, the core network information about each cell may be received from the network side device, and the core network information may be used to indicate the type of the core network. When the UE is in the idle state, the cell reselection may be performed in accordance with the type of the core network connected to each cell and the capability of the UE for supporting the core network. Because the UE may select the cell connected to the core network capable of being supported by the UE itself as the reselected cell and perform attachment to the reselected cell, it is able to prevent the waste of signaling resources caused when the reselected cell is inappropriate and an access is initiated again.

Figure 8:
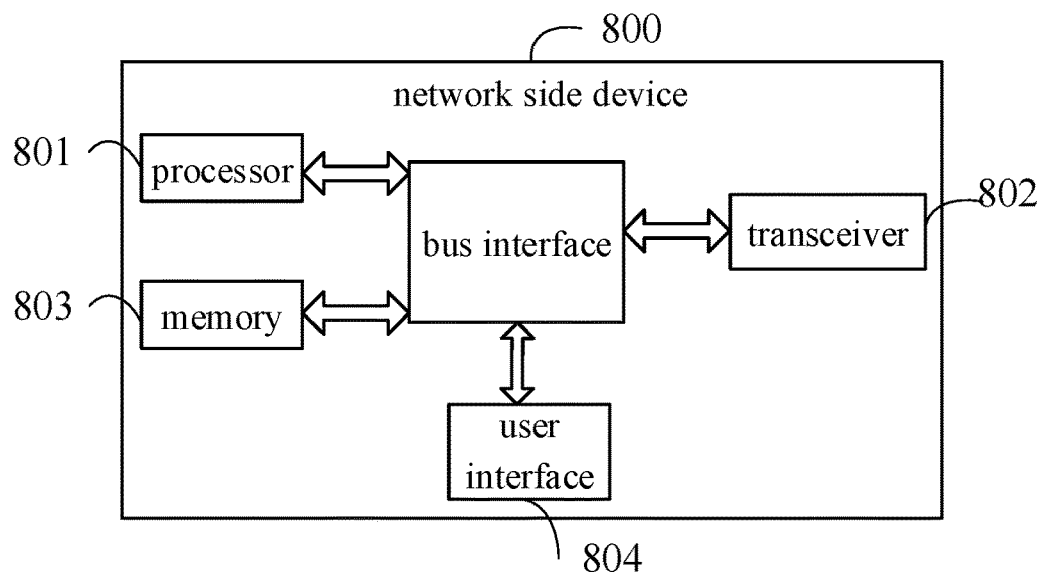
FIG. 8 is a schematic view showing a network side device according to one embodiment of the present disclosure.

The present disclosure further provides in some embodiments a network side device capable of implementing the above-mentioned mobility management method with a same technical effect. As shown in FIG. 8, the network side device 800 may include a processor 801, a transceiver 802, a memory 803, a user interface 804 and a bus interface. The processor 801 is configured to read a program stored in the memory 803, so as to transmit core network information about each cell to a UE, the core network information being used to indicate a type of a core network so that the UE performs cell reselection in accordance with the core network information about each cell and a capability of the UE for supporting the core network when the UE is in an idle state.

In FIG. 8, bus architecture may include any number of buses and bridges connected to each other, so as to connect various circuits for one or more processors 801 and one or more memories 803. In addition, as is known in the art, the bus architecture may be used to connect any other circuits, such as a circuit for a peripheral device, a circuit for a voltage stabilizer and a power management circuit. The bus interface may be provided, and the transceiver 802 may consist of a plurality of elements, i.e., a transmitter and a receiver for communication with any other devices over a transmission medium. With respect to different UEs, a user interface 804 may also be provided for devices which are to be arranged inside or outside the UE, and these devices may include but not limited to a keypad, a display, a speaker, a microphone and a joystick. The processor 801 may take charge of managing the bus architecture as well as general processings. The memory 803 may store therein data for the operation of the processor 801.

In a possible embodiment of the present disclosure, the core network information may be further used to indicate cell priority information, and the cell priority information may be used for the UE to determine a priority level of each to-be-attached cell and determine a target to-be-attached cell for attachment.

In a possible embodiment of the present disclosure, the cell priority information may include an absolute priority level or a relative priority level of each to-be-attached cell.

In a possible embodiment of the present disclosure, the relative priority level may include an offset value based on the type of the core network, an offset value based on a frequency, or an offset value based on an identification number of each cell.

In a possible embodiment of the present disclosure, the absolute priority level may include a priority level set in accordance with the type of the core network, a priority level set in accordance with an identification number of each to-be-attached cell, or a priority level set in accordance with a frequency of each to-be-attached cell.

In a possible embodiment of the present disclosure, the core network information may be a message transmitted by the network side device via system broadcasting and/or a message transmitted by the network side device via dedicated signaling.

In a possible embodiment of the present disclosure, the processor 801 is further configured to execute the program, so as to: determine a type of a core network used by a target cell to which the UE is to be switched; and transmit a handover command message to the UE in accordance with the determined type of the core network, and the handover command message may be used to indicate a target cell for handover to the UE so as to enable the UE to perform cell handover.

In a possible embodiment of the present disclosure, the source cell may be an eLTE cell connected to a 5G core network, a 5G NR cell or an LTE cell, and the target cell may be an eLTE cell connected to the 5G core network, a 5G NR cell or an LTE cell.

In a possible embodiment of the present disclosure, when the source cell is an eLTE cell and the target cell is an NR cell, a cell handover message may be an EUTRAN handover command message carrying an air-interface configuration parameter and an NR air-interface RAT type indicator of the target cell. The EUTRAN handover command message may carry or not carry information about core-network-related security parameters.

In a possible embodiment of the present disclosure, when the source cell is an NR cell and the target cell is an eLTE cell, the processor 801 is further configured execute the program so as to transmit an RRC reconfiguration message to the UE. When the target cell and the source cell belong to different core networks, the RRC reconfiguration message may carry the air-interface configuration parameter of the target cell and an IE of the core network information about the target cell, and when the target cell and the source cell belong to a same core network, the RRC reconfiguration message may carry the air-interface configuration parameter of the target cell, and may carry or not carry the IE of the core network information about the target cell.

In a possible embodiment of the present disclosure, when the source cell is an LTE cell and the target cell is an eLTE cell connected to a 5G core network, or when the source cell is an eLTE cell connected to a 5G core network and the target cell is an LTE cell, the processor 801 is further configured execute the program so as to transmit an RRC reconfiguration message to the UE, and the RRC reconfiguration message may carry the air-interface configuration parameter of the target cell and an IE of core network security-related information about the target cell.

In a possible embodiment of the present disclosure, when the source cell is an LTE cell and the target cell is an eLTE cell connected to a 5G core network, or when the source cell is an eLTE cell connected to a 5G core network and the target cell is an LTE cell, and the target cell and the source cell are a same cell, the processor 801 is further configured execute the program so as to transmit an RRC reconfiguration message to the UE, and the RRC reconfiguration message may carry the IE of the core network security-related information about the target cell.

According to the embodiments of the present disclosure, the core network information about each cell may be transmitted to the UE, and the core network information may be used to indicate the type of the core network, so that the UE performs cell reselection in accordance with the core network information about each cell and the capability of the UE for supporting the core network when the UE is in the idle state. Because the core network information about each cell is transmitted by the network side device to the UE, it is able for the UE to select the cell corresponding to the core network and capable of being supported by the UE itself as the reselected cell for attachment, thereby to prevent the waste of signaling resources caused when the reselected cell is inappropriate and an access is initiated again.

The present disclosure further provides in some embodiments a computer-readable storage medium storing therein a computer program. The computer program is executed by a processor so as to implement the above-mentioned mobility management method.

It should be appreciated that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

It should be further appreciated that, the device and method may be implemented in any other ways. For example, the embodiments for the apparatus is merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A mobility management method, comprising:
receiving core network information about each cell from a network side device, the core network information being used to indicate a type of a core network; and
when a UE is in a connected state, subsequent to receiving the core network information about each cell from the network side device, the mobility management method further comprises:
receiving a handover command message from the network side device in a source cell,
the handover command message being used to indicate a target cell for handover to the UE; and
performing cell handover in accordance with the target cell indicated in the handover command message;
when the source cell is an Enhanced Long Term Evolution (eLTE) cell, the target cell is a New Radio (NR) cell and the core network remains unchanged after the cell handover, a Non-Access Stratum (NAS) security parameter remains unchanged, wherein the handover command message comprises the NAS security parameter which comprises UTRAGERANNR.

2. An electronic device, comprising one or more processors, a memory, and one or more programs stored in the memory and executed by the one or more processors so as to implement the mobility management method according to claim 1.

3. A mobility management method, comprising:
transmitting core network information about each cell to a UE, the core network information being used to indicate a type of a core network so that the UE performs cell reselection in accordance with the core network information about each cell and a capability of the UE for supporting the core network when the UE is in an idle state, wherein the capability of the UE for supporting the core network is the type of the core network capable of being supported by the UE;
when the source cell is an Enhanced Long Term Evolution (eLTE) cell, the target cell is a New Radio (NR) cell and the core network remains unchanged after the cell handover, a Non-Access Stratum (NAS) security parameter remains unchanged, wherein a handover command message comprises the NAS security parameter which comprises UTRAGERANNR.

4. An electronic device, comprising one or more processors, a memory, and one or more programs stored in the memory and executed by the one or more processors so as to implement the mobility management method according to claim 3.

* * * * *